US011445342B2

(12) United States Patent
Ngai et al.

(10) Patent No.: US 11,445,342 B2
(45) Date of Patent: Sep. 13, 2022

(54) ENHANCEMENTS TO PEDESTRIAN TO VEHICLES (P2V) COMMUNICATIONS

(71) Applicant: QUALCOMM Incorporated, San Diego, CA (US)

(72) Inventors: Francis Ngai, Louisville, CO (US); Feng Lu, Santa Clara, CA (US); Joel Benjamin Linsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/833,354

(22) Filed: Mar. 27, 2020

(65) Prior Publication Data

US 2021/0306822 A1    Sep. 30, 2021

(51) Int. Cl.
*H04W 4/40* (2018.01)
*H04W 4/80* (2018.01)
*H04W 4/02* (2018.01)
*H04W 4/029* (2018.01)

(52) U.S. Cl.
CPC ............. *H04W 4/40* (2018.02); *H04W 4/023* (2013.01); *H04W 4/029* (2018.02); *H04W 4/80* (2018.02)

(58) Field of Classification Search
CPC ......... H04W 4/40; H04W 4/029; H04W 4/80; H04W 4/023
USPC ............................................................. 455/39
See application file for complete search history.

(56) References Cited

U.S. PATENT DOCUMENTS

| | | | | |
|---|---|---|---|---|
| 9,918,352 | B2* | 3/2018 | Vanderveen | H04W 36/0011 |
| 10,171,953 | B2* | 1/2019 | Narayanan | H04W 4/80 |
| 10,595,315 | B2* | 3/2020 | Nguyen | H04L 5/003 |
| 10,623,908 | B2* | 4/2020 | Jiang | G01S 5/0284 |
| 10,860,115 | B1* | 12/2020 | Tran | B64D 47/08 |
| 2016/0174122 | A1* | 6/2016 | Sorrentino | H04W 72/0486 370/331 |
| 2017/0018187 | A1* | 1/2017 | Kim | H04L 67/12 |
| 2018/0231979 | A1* | 8/2018 | Miller | G05D 1/0214 |
| 2018/0359298 | A1* | 12/2018 | Grimm | H04W 4/44 |
| 2019/0053115 | A1* | 2/2019 | Ngai | H04W 72/0493 |
| 2019/0246285 | A1* | 8/2019 | Ngai | H04W 72/0446 |
| 2019/0246408 | A1* | 8/2019 | Ngai | H04W 72/1215 |
| 2021/0089055 | A1* | 3/2021 | Tran | G08G 5/0078 |
| 2022/0132514 | A1* | 4/2022 | Nguyen | H04W 72/02 |

* cited by examiner

*Primary Examiner* — April G Gonzales
(74) *Attorney, Agent, or Firm* — Patterson & Sheridan, LLP (57) ABSTRACT

Certain aspects of the present disclosure generally relate to wireless communications and, more particularly, to mechanisms for enhancing pedestrian to vehicle (P2V) communications. For example, a pedestrian user equipment (P-UE) may detect a change in at least one of: location or motion of the UE adjust, based on the detection, behavior of one or more features of the UE related to P2V transmissions.

28 Claims, 9 Drawing Sheets

ENHANCEMENTS TO PEDESTRIAN TO VEHICLES (P2V) COMMUNICATIONS

INTRODUCTION

Field of the Disclosure

Certain aspects of the present disclosure generally relate to wireless communications and, more particularly, to methods and apparatus that may enhance pedestrian to vehicle (P2V) communications.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

Vehicle to everything (V2X) communications seek to enable vehicles to communicate with one another to provide a host of services, including vehicle to vehicle communications (V2V), vehicle to infrastructure (V2I) communications, vehicle to grid (V2G) communications and pedestrian to vehicle (P2V) communications.

P2V communications may be used in an effort to help vulnerable road users (VRUs), such as pedestrians and cyclists, reduce the risks related to phone usage in and around traffic areas. P2V communicates may help increase situational awareness of both VRUs and nearby vehicles, by having pedestrians and vehicles broadcast their position and mobility information.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE). The method generally includes detecting a change in at least one of: location or motion of the UE and adjusting, based on the detection, behavior of one or more features of the UE related to pedestrian to vehicle (P2V) transmissions.

Certain aspects provide a method for wireless communications by an apparatus. The method generally includes detecting a user equipment (UE) that supports pedestrian to vehicle (P2V) transmissions is inside a vehicle and sending, in response to the detection, beacons that indicates the cellular vehicle to everything (C-V2X) is operational in the vehicle.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Certain aspects of the present disclosure generally relate to wireless communications and, more particularly, to methods and apparatus for enhancing pedestrian to vehicle (P2V) communications between a pedestrian UE (P-UE) and vehicle UE (V-UE). As will be described in greater detail below, in some cases, situational awareness (e.g., based on location and/or motion of a P-UE) may be utilized to adjust P2V communications, for example, to reduce transmissions from the P-UE to save power when far from traffic and/or increase transmissions to increase safety when the P-UE is near traffic.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (SGTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

Figure 1:
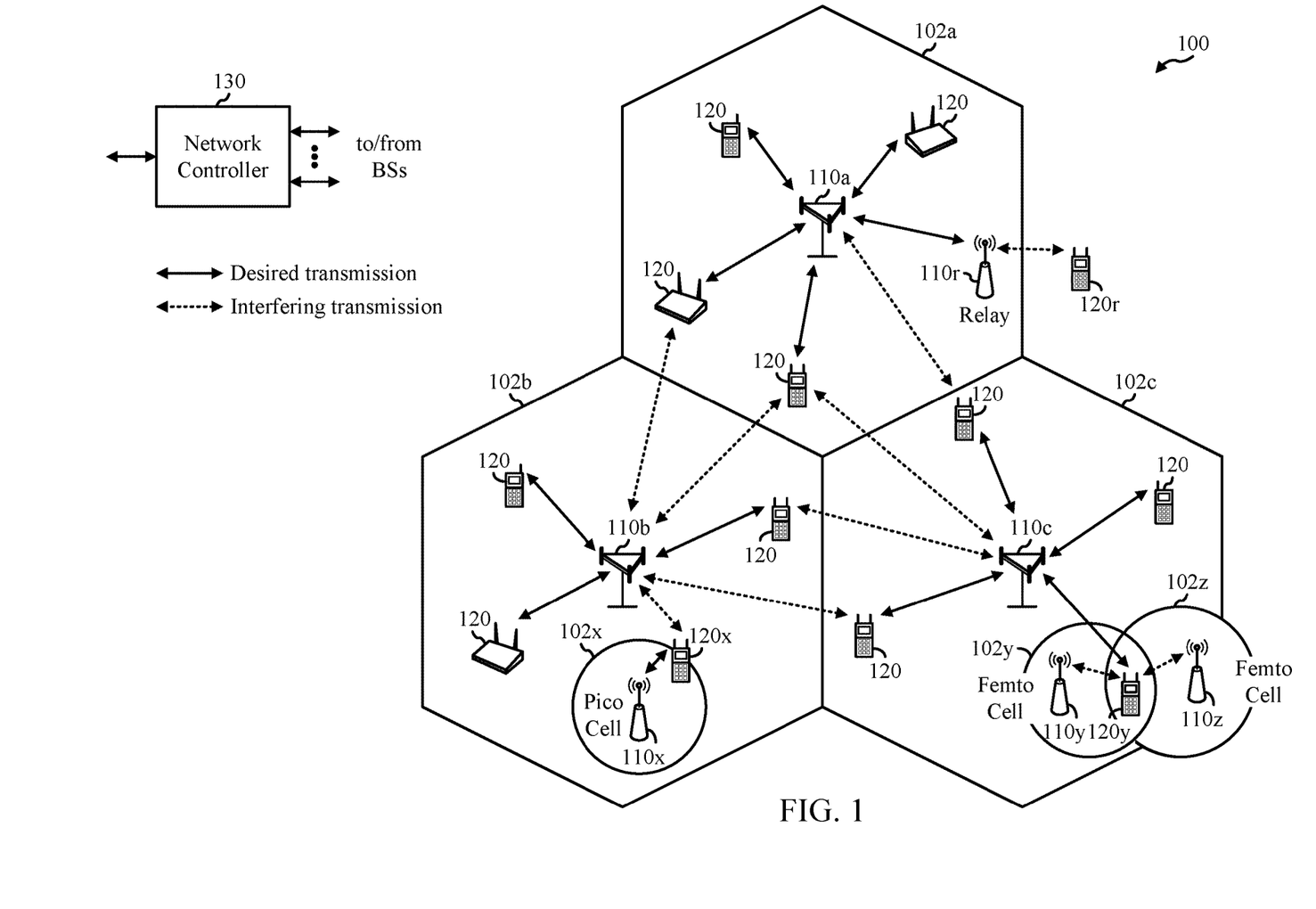
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, base stations 110 in the network may communicate with a UE 120 implemented as a P-UE (e.g., P-UE 120p of FIGS. 4, 5, and 6) configured to perform operations 700 of FIG. 7 or as a V-UE (e.g., V-UE 120v of FIGS. 4, 5, and 6) configured to perform operations 1000 of FIG. 10.

The wireless network 100 may be a new radio (NR) or 5G network. As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile BS. In some examples, the base stations may be interconnected to one another and/or to one or more other BSs or network nodes (not shown) in the wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a cyclic prefix (CP) on the uplink and downlink and include support for half-duplex operation using time division duplexing (TDD). A single component carrier (CC) bandwidth of 100 MHz may be supported. NR resource blocks may span 12 subcarriers with a subcarrier bandwidth of 75 kHz over a 0.1 ms duration.

Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units (CUs) and/or distributed units (DUs).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
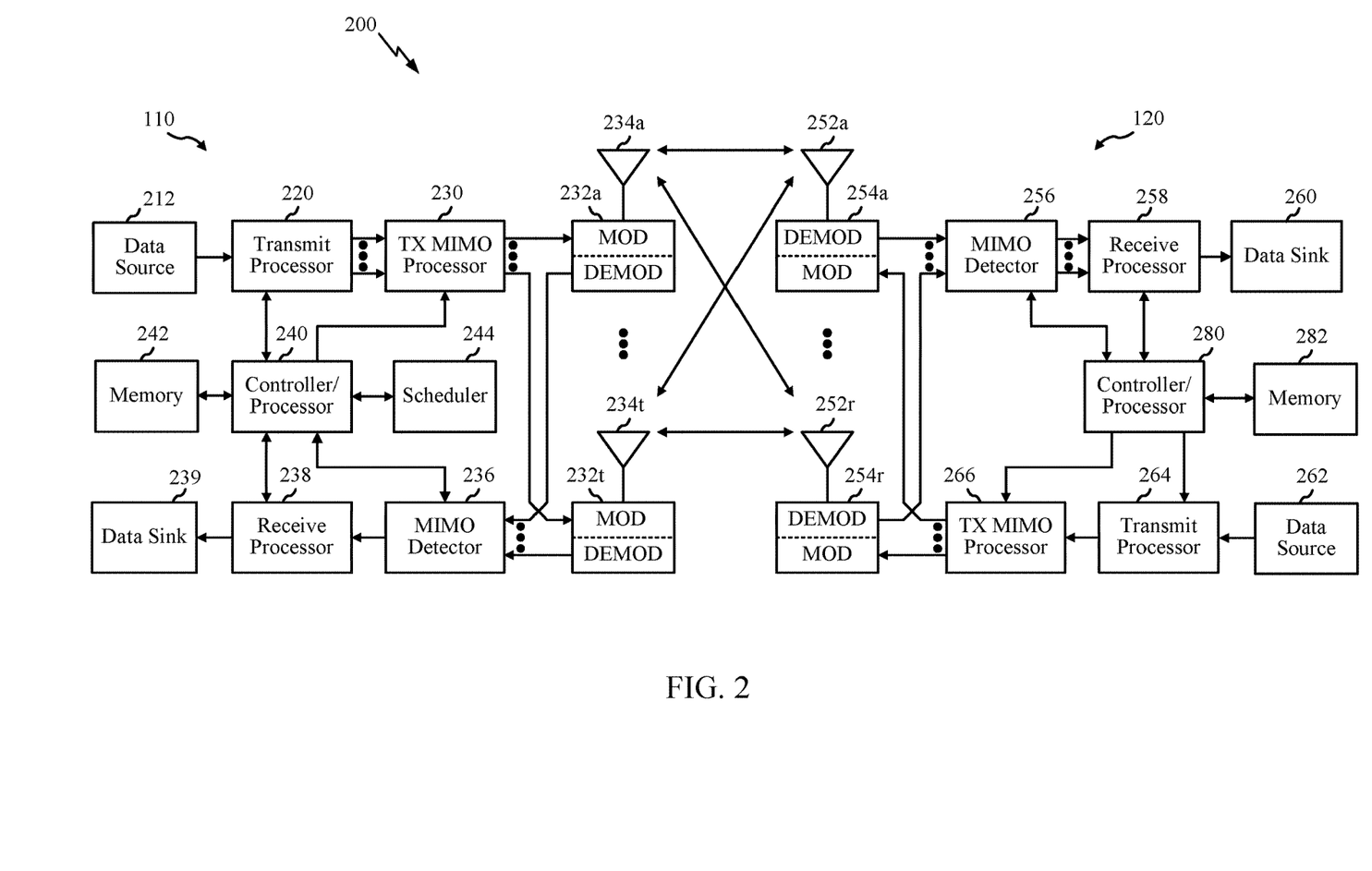
FIG. 2 is a block diagram conceptually illustrating a design of an example base station (BS) and user equipment (UE), in accordance with certain aspects of the present disclosure.

FIG. 2 illustrates example components of the BS 110 and UE 120 illustrated in FIG. 1, which may be used to implement aspects of the present disclosure. As previously described, the UE 120 may be implemented as a P-UE (e.g., P-UE 120p of FIG. 4) configured to perform operations 700 of FIG. 7 or as a V-UE (e.g., V-UE 120v of FIG. 4) configured to perform operations 1000 of FIG. 10.

FIG. 2 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 234a through 234t, and the UE 120 may be equipped with antennas 252a through 252r.

At the BS 110, a transmit processor 220 may receive data from a data source 212 and control information from a controller/processor 240. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 220 may process (e.g., encode and symbol map) the data and control information to obtain data symbols and control symbols, respectively. The processor 220 may also generate reference symbols, e.g., for the PSS, SSS, and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the Physical Uplink Shared Channel (PUSCH)) from a data source 262 and control information (e.g., for the Physical Uplink Control Channel (PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the base station 110 and the UE 120, respectively. The memories 242 and 282 may store data and program codes for the BS 110 and the UE 120, respectively. A scheduler 244 may schedule UEs for data transmission on the downlink and/or uplink.

In some circumstances, two or more entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

V2X has been developed as a technology to address vehicular wireless communications to enhance road safety and the driving experience. In the context of V2X, a user may refer to a driver or passenger, while a vehicle may refer to any motor vehicle (cars, mopeds, motorcycles, ATV, etc.) or non-motor vehicles (e.g., bicycles).

Figure 3:
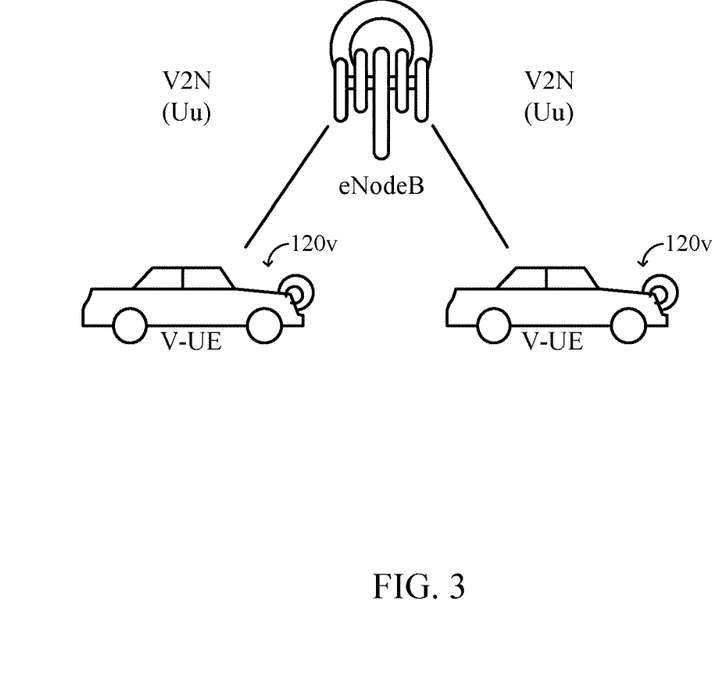
FIGS. 3 and 4 illustrate example vehicle to everything (V2X) communication systems, in accordance with certain aspects of the present disclosure.
Figure 4:
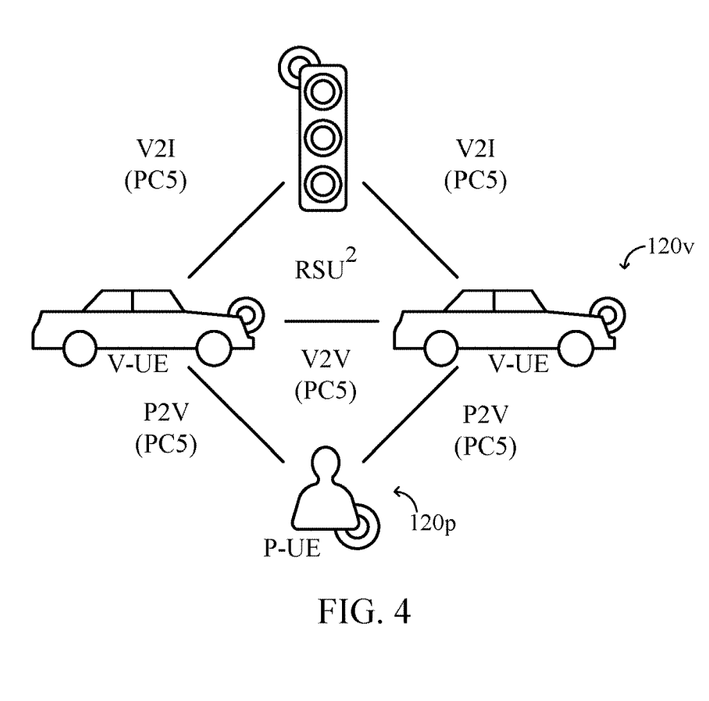

FIGS. 3 and 4 illustrated V2X systems that employ complementary transmission modes. A first transmission mode, illustrated in FIG. 3, involves network communications through a network. A second transmission mode, illustrated in FIG. 4, involves direct communications between participants in the local area.

Referring first to FIG. 3, the first transmission modes is illustrated. In the illustrated embodiment, a vehicle may communicate to another vehicle through network communications. These network communications may occur through discrete nodes, such as eNodeB (or gNodeB), that send and receive information between vehicles. The network communications may be used, for example, for long range communications between vehicles, such as noting the presence of an accident approximately 1 mile ahead. Other types of communication may be sent by the node to vehicles, such as traffic flow conditions, road hazard warnings, environmental/weather reports, service station availability and other like data. Data can be obtained from cloud-based sharing services.

The V2X system may be configured to work in a 5.9 GHz spectrum, thus any vehicle with an equipped system may access this common frequency and share information. Such harmonized/common spectrum operations allows for safe operation. V2X operations may also co-exist with 802.11p operations by being placed on different channels, thus existing 802.11p operations will not be disturbed by the introduction of V2X systems. In one non-limiting embodiment, the V2X system may be operated in a 10 MHz band that describes/contains basic safety services. In other non-limiting embodiments, the V2X system may be operated over a wider frequency band of 70 MHz to support advanced safety services in addition to basic safety services described above.

For network communications, residential service units (RSUs) may be utilized as well as 4G/5G small cell communication technologies to benefit in more highly covered areas to allow real time information to be shared among V2X users. As the number of RSUs diminishes, the V2X systems may rely more on small cell communications, as necessary.

Referring next to FIG. 4, the second transmission mode allows for direct communication between different participants in a given geographic location. As illustrated, a pedestrian UE (P-UE 120p) can communicate with a vehicle UE (V-UE 120v), via P2V communications (e.g., through a PC5 interface). Communications between a vehicle and another vehicle (V2V) may also occur through a PC5 interface. In a like manner, communication may occur from a vehicle to other highway components, such as a signal (V2I) through a PC5 interface. In each embodiment illustrated, two-way communication can take place between elements, therefore each element may be a transmitter and a receiver of information. In the configuration provided, the first transmission mode is a self-managed system and no network assistance is provided. Such transmission modes provide for reduced cost and increased reliability as network service interruptions do not occur during handover operations for moving vehicles. Resource assignments do not need coordination between operators and subscription to a network is not necessary, therefore there is reduced complexity for such self-managed systems.

In either of the two complementary transmission modes, higher layers may be leveraged to tune congestion control parameters. In high density vehicle deployment areas, using higher layers for such functions provides an enhanced performance on lower layers due to congestion control for PHY/MAC.

Example Enhancements to Pedestrian to Vehicles (P2V) Communications

Certain aspects of the present disclosure generally relate to wireless communications and, more particularly, to mechanisms for enhancing pedestrian to vehicle (P2V) communications. For example, the mechanisms presented herein may help a P-UE save power by prevent unnecessary P2V transmissions by dynamically enabling P2V transmissions (only) when a P-UE is close to a road or by relying on a vehicle UE (V-UE) for P2V transmissions when a P-UE is actually in a vehicle. Either such mechanism may help extend battery life and improve overall user experience.

Figure 5:
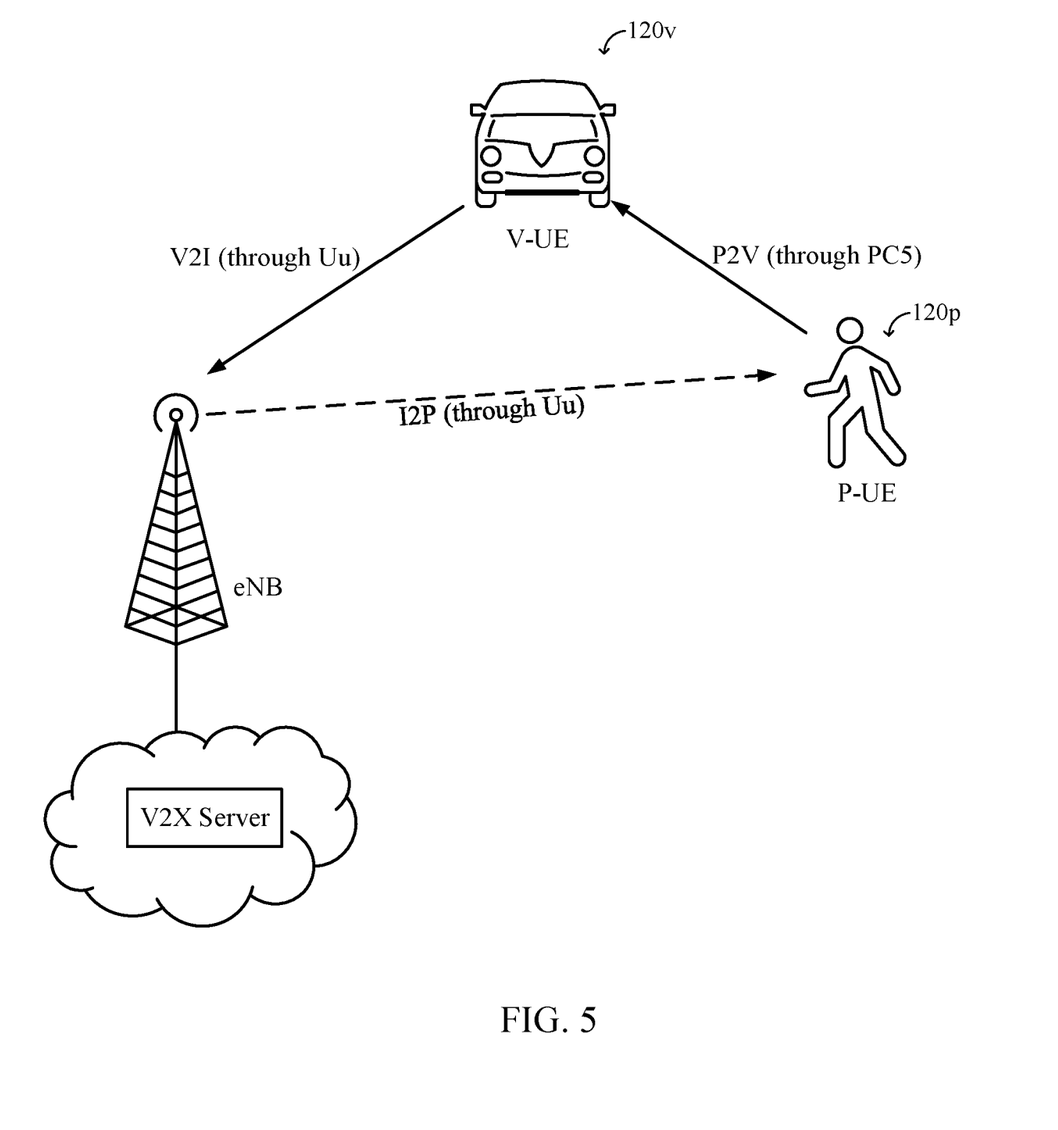
FIG. 5 illustrates an example vehicle to pedestrian scenario, in which aspects of the present disclosure may be practiced.

The mechanisms may be implemented in a P2V system, such as that shown in FIG. 5.

As illustrated in FIG. 5, the P2V system may employ a combination of interfaces, for example, an infrastructure to pedestrian (I2P) "Uu" radio interface between a P-UE 120p, a vehicle to infrastructure (V2I) Uu radio interface between a V-UE 120v and the radio access network, as well as a pedestrian to vehicle (P2V) sidelink interface (e.g., a PC5 interface) between the P-UE and V-UE. The Uu interface generally refers to the radio interface between the (various types of) UEs and the radio access network.

The V-UE may provide assistance in warning a pedestrian (associated with the P-UE) of a potential collision by signaling a cloud-based vehicle to everything (V2X) server, prompting the V2X server to request the eNB page the P-UE as an alert of the potential collision.

Figure 6:
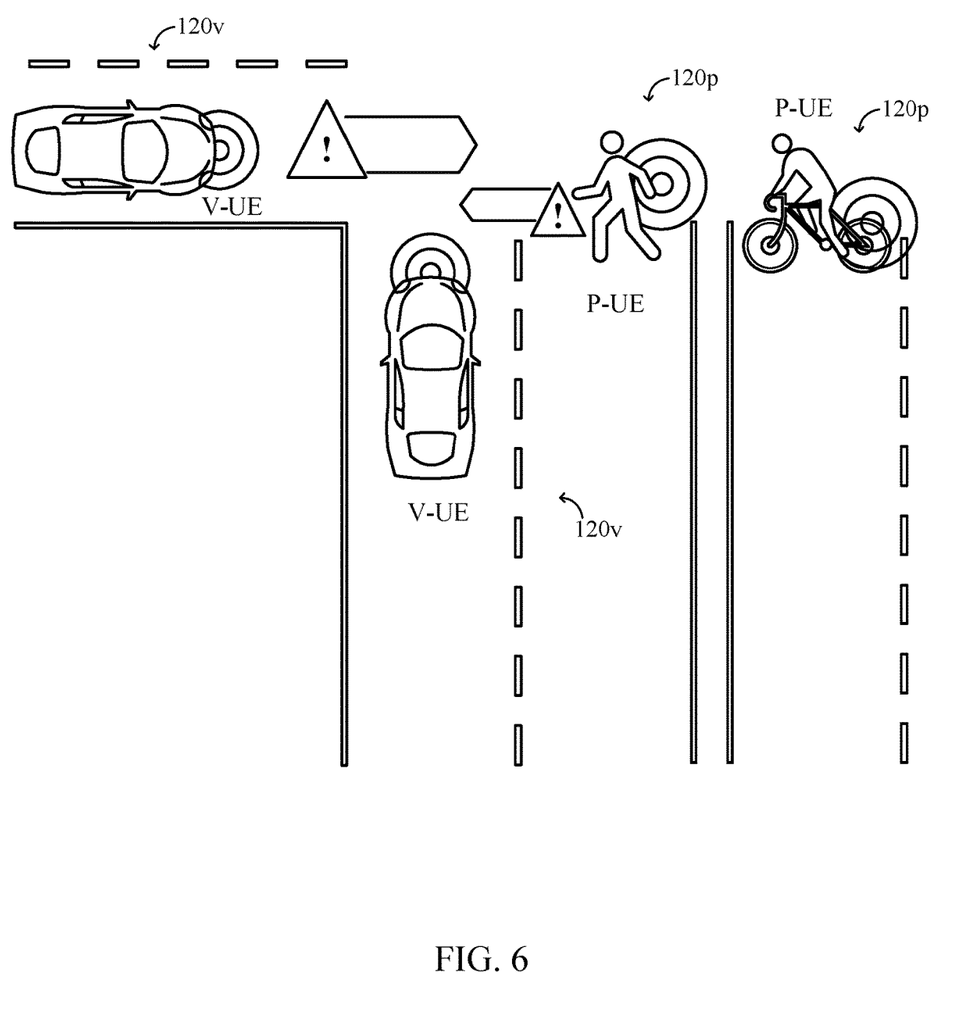
FIG. 6 illustrates example pedestrian UEs (P-UEs), in which aspects of the present disclosure may be practiced.

As illustrated in FIG. 6, P2V communications may be used in an effort to help vulnerable road users (VRUs), such as pedestrians and cyclists, reduce the risks related to phone usage in and around traffic areas. P2V communicates may help increase situational awareness of both VRUs and nearby vehicles, by having pedestrians and vehicles broadcast their position and mobility information.

Power consumption may not be a significant issue for V-UEs, due to the availability of the vehicles power system (e.g., where a 12V battery is constantly charged by an alternator when the vehicle is running). Because a P-UE typically has a much smaller battery power consumption may be a significant issue for P-UEs.

Aspects of the present disclosure may help optimize P-UE power consumption, for example, by dynamically enabling a P-UE's P2V communications only when the P-UE is close to traffic. Dynamically enabling/disabling P2V may also help enhance resource allocation for one or more other applications (e.g., eLAA/5 GHz wireless local area network (WLAN)) when the P-UE's P2V communications shares RF circuitry (e.g., a power amplifier) with those other applications.

Figure 7:
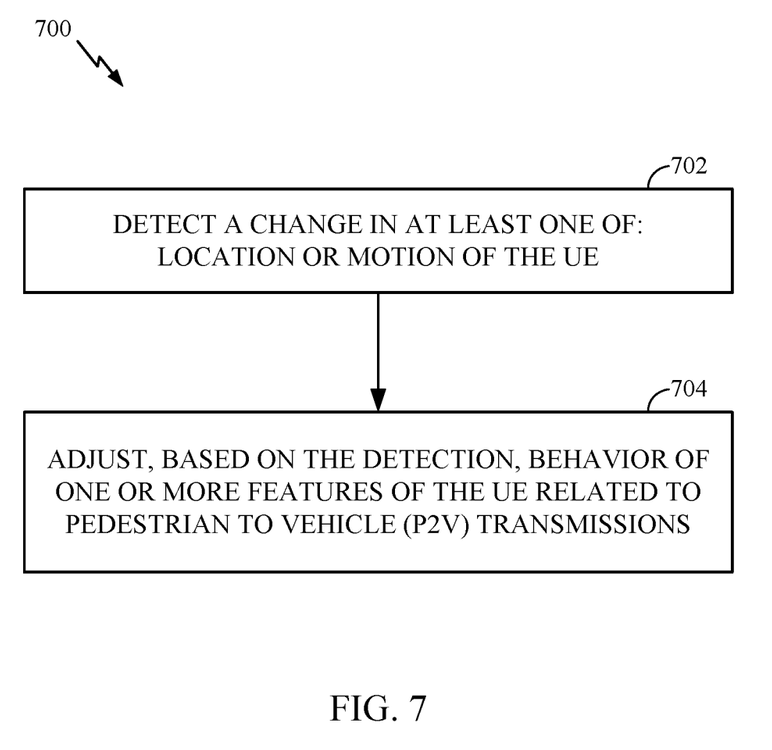
FIG. 7 illustrates example operations for wireless communications by a user equipment (UE), in accordance with certain aspects of the present disclosure.

FIG. 7 illustrates example operations 700 for wireless communications by a P-UE, in accordance with certain aspects of the present disclosure. For example, operations 700 may be performed by one of the P-UEs 102p shown in FIGS. 4, 5, and 6 to dynamically enable/disable P2V communications.

Operations 700 begin, at 702, by detecting a change in at least one of: location or motion of the UE. For example, the P-UE may monitor sensors on the P-UE, obtain location information (e.g., via GPS or via a network/Uu interface), or detect its relative proximity to a V-UE (based on a V-UE broadcast beacon via a P2V interface).

At 704, the P-UE adjusts, based on the detection, behavior of one or more features of the UE related to pedestrian to vehicle (P2V) transmissions. For example, the P-UE may enable, disable, or change the frequency of P2V transmissions.

Figure 8:
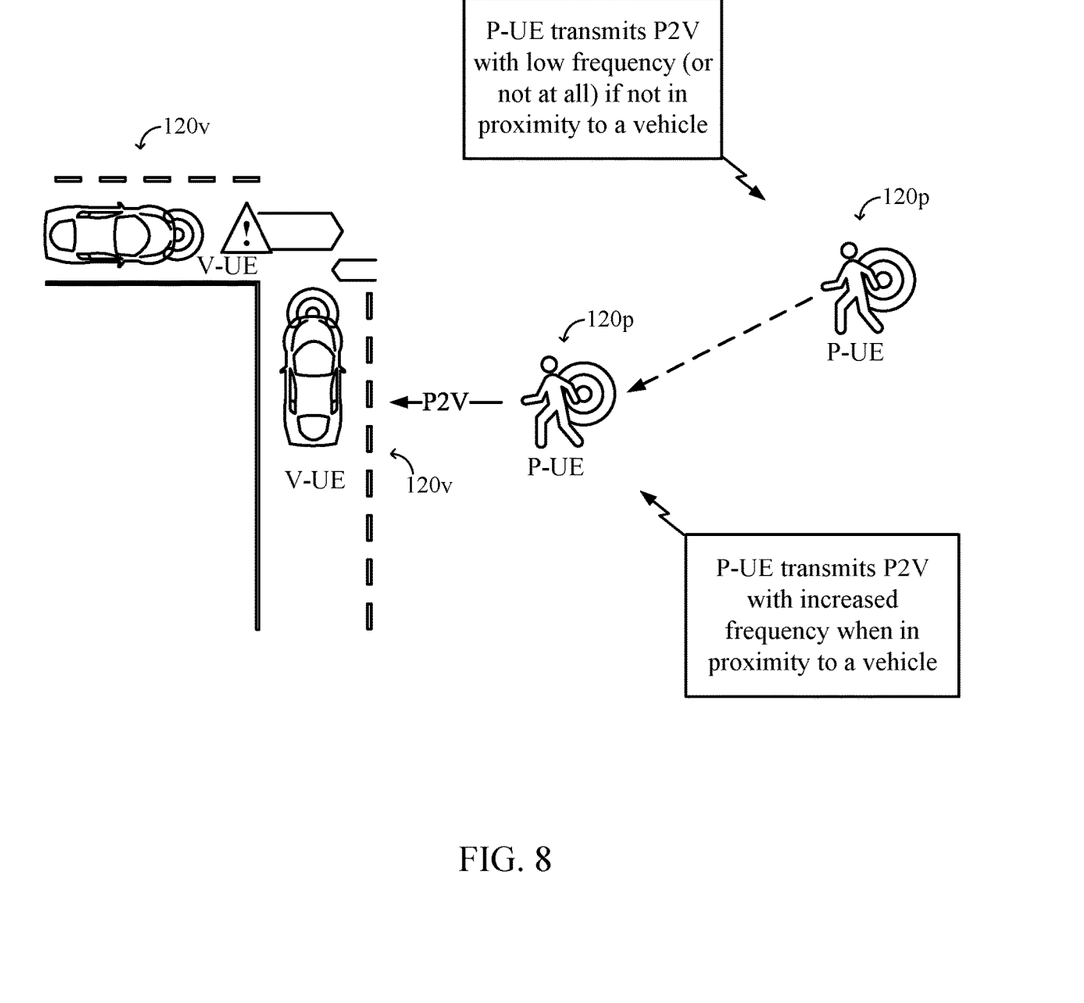
FIG. 8 illustrates how P-UE pedestrian to vehicle (P2V) communications may be adjusted based on location or movement, in accordance with certain aspects of the present disclosure.

Operations 700 may be understood with reference to the example scenario shown in FIG. 8, in which a P-UE adapts its P2V transmissions based on P-UE motion and/or location (e.g., based on motion estimates provided by sensors in the P-UE or by detecting P2V transmissions from a V-UE).

In the example illustrated in FIG. 8, P-UE 120p sends P2V transmissions with low frequency (or not at all) if it is not in proximity to a vehicle. The P-UE 120p may determine it is not near a vehicle, based on location data (e.g., that indicates it is not near a road) or based on a lack of detected P2V transmissions from a V-UE 120v. In some cases, the P-UE may adapt its P2V transmissions based on net displacement (e.g., motion or distance covered in some amount of time) estimates provided by sensors in P-UE (e.g., which may indicate it is rapidly approaching a road).

The P-UE may increase the frequency of its P2V transmissions, however, when the P-UE is in proximity to (or approaching) a vehicle. The P-UE may determine it is in proximity to a vehicle, for example, by detecting P2V transmissions from the vehicle. It may also increase frequency of its P2V transmissions if it determines, based on location data, that is near or approaching a road.

In some cases, a P-UE's P2V transmissions may be adapted based on net displacement (a motion or speed estimate). For example, assuming P2V is enabled (e.g., the P-UE is near a vehicle or road), the frequency of P2V transmissions from the UE may be increased if it the P-UE is in a relatively high mobility state (e.g., a user is riding a bike) to provide more frequent updates and decreased if the P-UE is in a relatively low mobility state (e.g., a user is walking).

In some cases, P2V behavior of a UE may be adapted to take advantage of resources available by a V-UE. For example, if a P-UE is actually located within a vehicle that supports C-V2X and C-V2X is enabled, it may make little sense for the P-UE to send its own P-2V transmissions.

Figure 9:
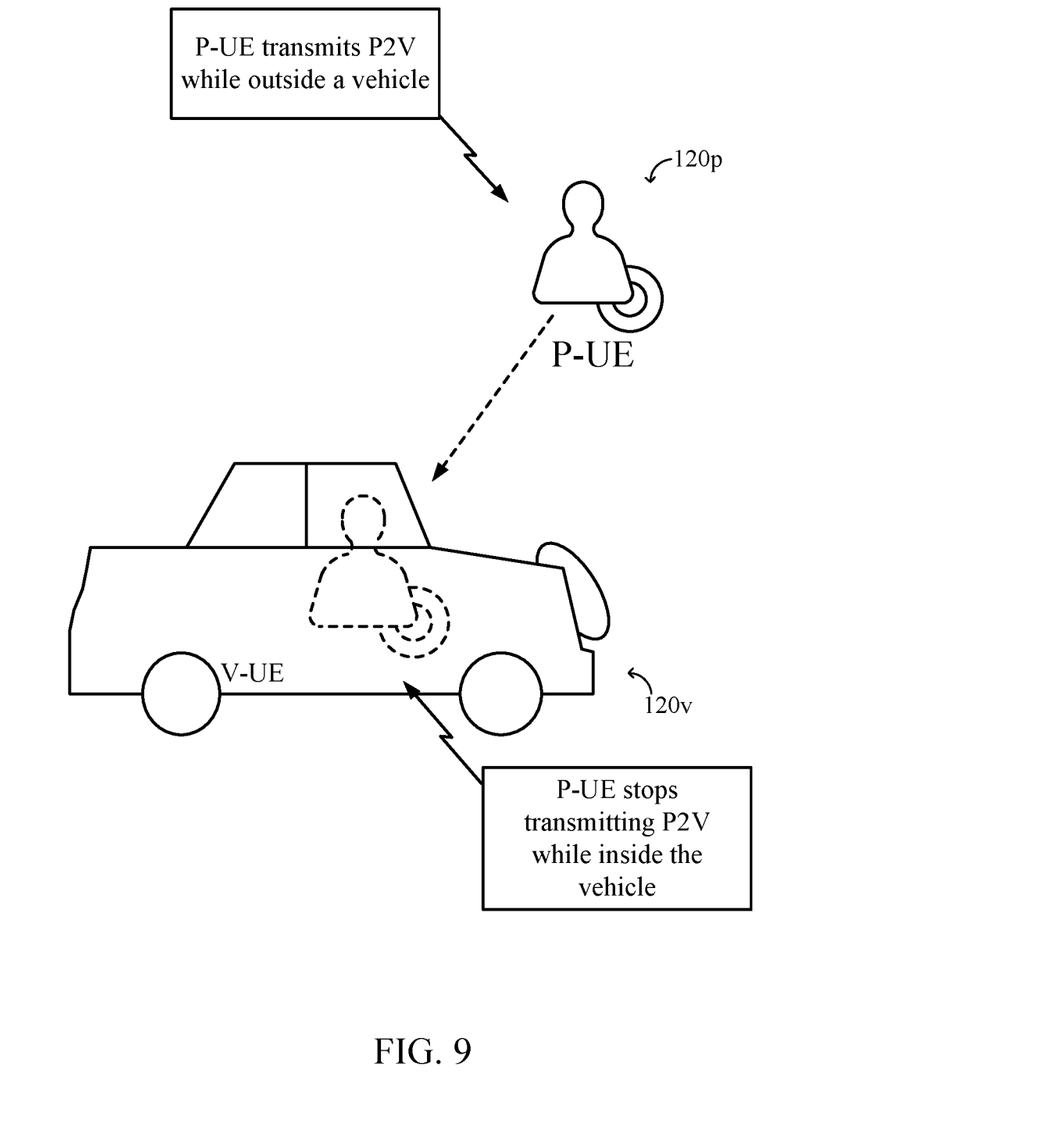
FIG. 9 illustrates how P-UE P2V communications may be adjusted when inside a vehicle, in accordance with certain aspects of the present disclosure.

In such cases, as illustrated in the example of FIG. 9, the P-UE 120p may disable P2V transmissions when it detects it is within a vehicle (associated with V-UE 102v), as the V-UE P2V transmissions can be considered sufficient to encompass both the drive and passenger(s). In addition, P2V transmissions from the P-UE while the P-UE is in a V-UE may cause confusion (e.g., leading to a conclusion a collision is imminent).

As illustrated, when the P-UE 102p is outside the vehicle, in may enable (or re-enable P2V transmissions. As described below, in some cases, the V-UE may assist the P-UE in determining when it is inside or outside the vehicle, which may help the P-UE rapidly disable or re-enable P2V transmissions.

The P-UE may determine it is in a V-UE based on different considerations. In some cases, a P-UE may determine it is within a V-UE if it associates with a vehicle's WLAN or Bluetooth® (BT) system. Being within range of a vehicle's WLAN or BT system may not be sufficient to determine the P-UE is actually in the vehicle (e.g., the P-UE may not be able to distinguish being in front of the car or in the backseat).

In some cases, a V-UE may detect a P-UE and assist the P-UE in determining it is inside a vehicle.

Figure 10:
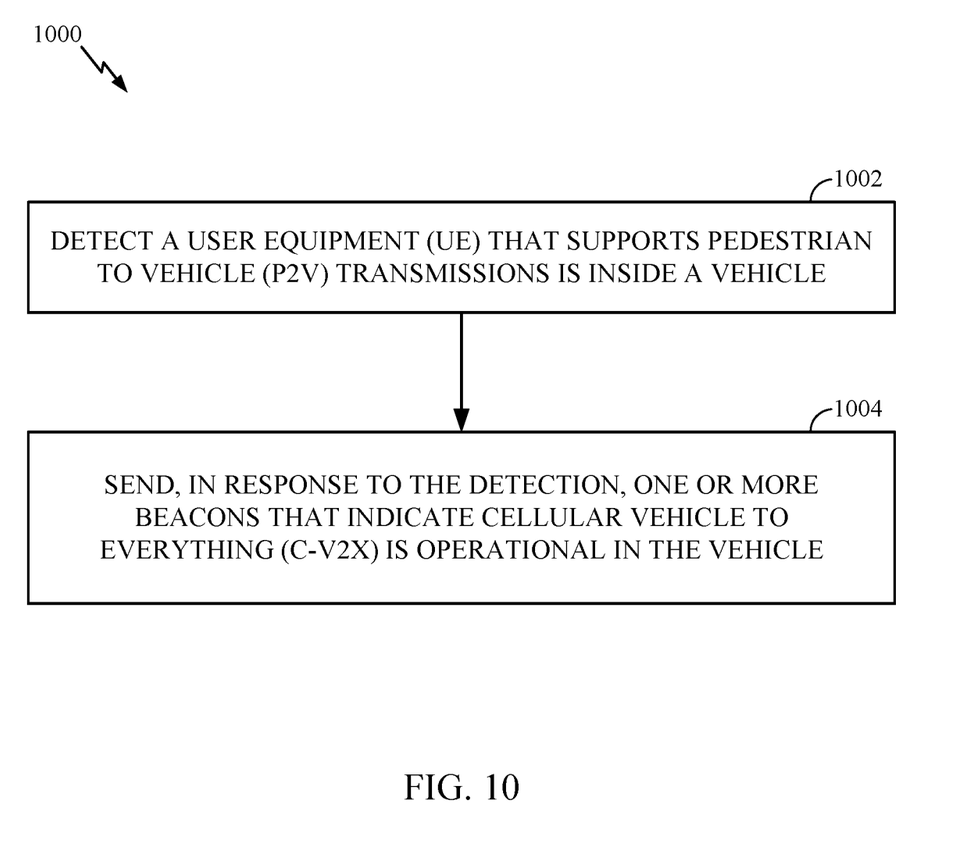
FIG. 10 illustrates example operations for wireless communications by an apparatus, in accordance with certain aspects of the present disclosure.

For example, FIG. 10 illustrates example operations 1000 for wireless communications by a V-UE that may help a P-UE determine it is inside a vehicle, in accordance with certain aspects of the present disclosure. For example, operations 1000 may be performed by one of the V-UEs 102v shown in FIGS. 4, 5, and 6 to detect the presence of a P-UE 120p.

Operations 1000 begin, at 1002, by detecting a UE that supports P2V transmissions is inside a vehicle. In some cases, the V-UE may detect the P-UE is inside the vehicle by using its WLAN or BT system to perform a position/location procedure to determine if the P-UE is inside or outside the vehicle.

At 1004, the V-UE sends, in response to the detection, beacons that indicate that C-V2X is operational in the vehicle. In some cases, the V-UE may periodically send such beacons indicating the states of these two attributes (whether the P-UE is inside or outside the vehicle and whether C-V2X of the vehicle is enabled and operational). In some cases, a beacon may include bits or fields to indicate these states. In other cases, the beacon itself may indicate the P-UE is inside the vehicle and C-V2X is enabled and operational.

Thus, detection of the beacons may indicate to a P-UE that it is inside a V-UE with C-V2X enabled and, thus, it can disable its P2V transmissions. A P-UE may already be configured to periodically scan for similar type beacons (e.g., to detect other devices).

A P-UE may be configured to enable (or re-enable) its P2V transmissions if it misses (or otherwise fails to receive) a beacon or if the P-UE receives a beacon indicating the P-UE is either outside the vehicle or that C-V2x of the vehicle is disabled or no longer fully functional for some reason.

In some cases, the beacon may be tuned so that it is detectable by a P-UE only when it actually inside a V-UE. For example, the V-UE may limit the transmission power such that it is likely only detectable from within the vehicle. In some cases, the V-UE may ramp transmission power up until a P-UE confirms it has detected the beacon.

In some cases, a P-UE may determine it is inside a vehicle only after it detects beacons from the same V-UE repeatedly. In case the P-UE detects beacons from multiple V-UEs, it may employ some type of algorithm or heuristic approach to decide on which V-UE it is actually in. For example, the UE should be able to continue to detect the beacon of a V-UE it changes locations (and the P-UE and V-UE travel together).

Ideally, a P-UE would re-enable C-V2X (P2V transmissions) quickly upon exiting a vehicle. In some cases, a V-UE may help a P-UE discern when it is exiting a vehicle. In some cases, the V-UE may provide a P-UE an indication a car door is opening or closing.

In some cases, a V-UE may include a counter in the beacon. This counter could be reset when a door closes and increment with each beacon transmission, so the P-UE can identify it is in the same vehicle (if the P-UE detects beacons from the same V-UE with a counter that continues to increase).

Dynamically enabling/disabling a P-UE's C-V2X functionality based on a P-UEs location or motion may help reduce power consumption, for example, by avoiding unnecessary P2V transmissions when the P-UE is not near a road or when the P-UE is within a V-UE that has C-V2X functionality that could encompass the P-UE.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, various processors shown in FIG. 4 may be configured to perform operations described herein and illustrated in FIGS. 7 and/or 10.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIG. 7 or 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
   detecting a change in at least one of: location or motion of the UE; and
   adjusting, based on the detection, behavior of one or more features of the UE related to pedestrian to vehicle (P2V) transmissions, wherein the adjusting comprises disabling the P2V transmissions when:
   based on the detecting, the UE is detected to be inside a vehicle, and
   cellular vehicle-to-everything (C-V2X) communications are enabled in the vehicle.

2. The method of claim 1, wherein:
   the detecting comprises detecting a change in motion or net displacement of the UE; and
   the adjusting comprises adjusting a frequency of the P2V transmissions.

3. The method of claim 1, wherein based on the detecting, when the UE is not in proximity to a vehicle, the adjusting comprises disabling P2V transmissions.

4. The method of claim 1, further comprising:
further detecting the UE is no longer inside the vehicle or that the C-V2X communications are no longer enabled in the vehicle; and
the adjusting comprises re-enabling P2V transmissions from the UE based on the further detection.

5. The method of claim 1, wherein wherein the detecting comprises detecting the UE is inside a vehicle based on detection of a transmitted beacon indicating that C-V2X communications are enabled in the vehicle.

6. The method of claim 5, wherein the transmitted beacon also indicates that C-V2X communications are enabled and operational in the vehicle.

7. The method of claim 5, further comprising re-enabling the P2V transmissions from the UE when the transmitted beacon is not detected within a certain period.

8. The method of claim 1, wherein the UE keeps the P2V transmissions disabled even when the vehicle is not moving and the C-V2X communications are enabled in the vehicle.

9. The method of claim 1, further comprising re-allocating resources previously used for the P2V transmission to other functions.

10. A method for wireless communications by an apparatus in a vehicle, comprising:
detecting a user equipment (UE) that supports pedestrian to vehicle (P2V) transmissions is inside the vehicle; and
sending, in response to the detection, one or more beacons that indicate cellular vehicle to everything (C-V2X) communications are operational in the vehicle.

11. The method of claim 10, wherein the one or more beacons also indicate the UE is inside the vehicle.

12. The method of claim 10, further comprising ceasing sending the one or more beacons in response to detecting the UE is no longer inside the vehicle.

13. The method of claim 10, further comprising at least one of sending or updating a beacon in response to detecting a door has opened or closed.

14. The method of claim 10, wherein a range of the one or more beacons is tuned to cover the inside of the vehicle.

15. A user equipment (UE), comprising:
a memory comprising executable instructions; and
one or more processors configured to execute the executable instructions and cause the UE to:
detect a change in at least one of: location or motion of the UE; and
adjust, based on the detection, behavior of one or more features of the UE related to pedestrian to vehicle (P2V) transmissions, wherein, in order to adjust the behavior of the one or more features of the UE, the one or more processors are further configured to cause the UE to disable P2V transmissions when:
based on the detection, the UE is inside a vehicle, and
cellular vehicle-to-everything (C-V2X) communications is enabled in the vehicle.

16. The UE of claim 15, wherein:
in order to detect the change in the location or the motion of the UE, the one or more processors are further configured to cause the UE to detect a change in motion or net displacement of the UE; and
in order to adjust the behavior of the one or more features of the UE, the one or more processors are further configured to cause the UE to adjust a frequency of the P2V transmissions.

17. The UE of claim 15, wherein, in order to adjust the behavior of the one or more features of the UE, the one or more processors are configured to cause the UE to disable the P2V transmissions when, based on the detection, the UE is not in proximity to the vehicle.

18. The UE of claim 15, wherein:
in order to detect the change in the location or the motion of the UE, the one or more processors are further configured to cause the UE to detect that the UE is no longer inside the vehicle or that the C-V2X communications are no longer enabled in the vehicle; and
in order to adjust the behavior of the one or more features of the UE, the one or more processors are further configured to cause the UE to re-enable the P2V transmissions from the UE based on the further detection.

19. The UE of claim 15, wherein: in order to detect the change in the location or the motion of the UE, the one or more processors are configured to cause the UE to detect that the UE is inside the vehicle based on detection of a transmitted beacon indicating that the C-V2X communications are enabled in the vehicle.

20. The UE of claim 19, wherein the transmitted beacon also indicates that the C-V2X communications are enabled and operational in the vehicle.

21. The UE of claim 19, wherein in order to adjust the behavior of the one or more features of the UE, the one or more processors are configured to cause the UE to re-enable P2V transmissions from the UE when the transmitted beacon is not detected within a certain period.

22. The UE of claim 15, wherein the one or more processors are further configured to cause the UE to keep the P2V transmissions disabled even when the vehicle is not moving and the C-V2X communications are enabled in the vehicle.

23. The UE of claim 15, wherein the one or more processors are further configured to cause the UE to re-allocate resources previously used for the P2V transmission to other functions.

24. An apparatus in a vehicle, comprising:
a memory comprising executable instructions; and
one or more processors configured to execute the executable instructions and cause the apparatus to:
detect a user equipment (UE) that supports pedestrian to vehicle (P2V) transmissions is inside the vehicle; and
send, in response to the detection, one or more beacons that indicate cellular vehicle to everything (C-V2X) communications are operational in the vehicle.

25. The apparatus of claim 24, wherein the one or more beacons also indicate the UE is inside the vehicle.

26. The apparatus of claim 24, wherein the one or more processors are further configured to cause the apparatus to cease sending the one or more beacons in response to detecting the UE is no longer inside the vehicle.

27. The apparatus of claim 24, wherein the one or more processors are further configured to cause the apparatus to at least one of send or update a beacon in response to detecting a door has opened or closed.

28. The apparatus of claim 24, wherein the one or more processors are further configured to cause the apparatus to tune a range of the one or more beacons to cover the inside of the vehicle.

* * * * *